Oct. 6, 1970

KATSUYOSHI FUJIMOTO

CATHODE RAY TUBE VIEW SCREEN STRUCTURE 3,532,919

Filed March 7, 1968

Katsuyoshi Fujimoto,
INVENTOR.

BY
Neil J. Driscoll

ATTORNEY.

United States Patent Office 3,532,919
Patented Oct. 6, 1970

3,532,919
CATHODE RAY TUBE VIEW SCREEN STRUCTURE
Katsuyoshi Fujimoto, Carlsbad, Calif., assignor to Hughes Aircraft Company, Culver City, Calif., a corporation of Delaware
Filed Mar. 7, 1968, Ser. No. 715,944
Int. Cl. H01j 29/18
U.S. Cl. 313—92    4 Claims

ABSTRACT OF THE DISCLOSURE

The structure disclosed is a cathode ray tube view screen structure for visible display of intelligent information. The structure comprises a faceplate of transparent material, such as glass, having a very thin coating of gold-aluminum black evaporatively adhering to the inner surface of the plate. Gold-aluminum black is an alloy of gold and aluminum evaporated in an imperfect vacuum usually from a tungsten filament or boat on to the faceplate. A phosphor coating is fixedly secured to the gold-aluminum black coating and provides luminescence during electron bombardment.

---

Figure 2:
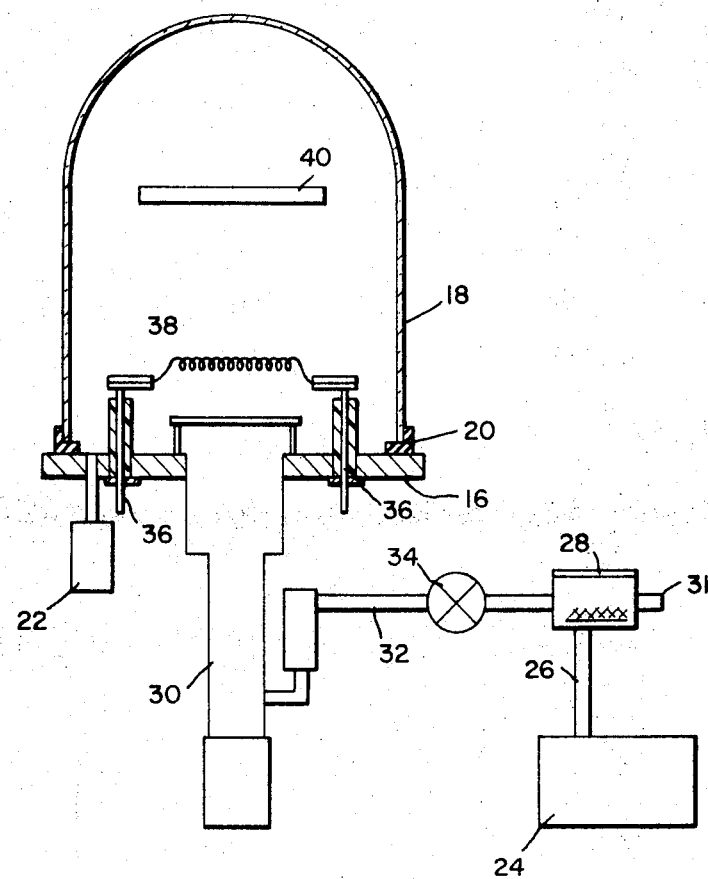

The invention herein described was made in the course of or under a contract with the Air Force. The invention relates to a cathode ray tube view screen structure and the method of application thereof.

BACKGROUND OF THE INVENTION

An important problem heretofore existent in cathode ray tube operation relates to providing the required resolution and contrast of the visible image created so that clarity of display is obtained under a wide variety of varying ambient light conditions. As is well known, luminescence is produced by a phosphor or other cathode-luminescent material coated on the inner surface of the tube viewing screen. The material emits light in response to electron bombardment and resulting excitation. However, the clarity and resolution of the light images produced, characteristically is degraded by dispersion of the light created in each discrete segment of the phosphor screen. That is, the light image tends to spread out or mushroom as it appears on the view screen face. This is due to the fact that the light emerges from the screen in an infinite number of angular paths relative to the generally planar screen.

In an effort to reduce visible light dispersion, the prior art has suggested the application of a coating of black or dark gray material to the inner surface of the view screen and interfaced between the screen and the luminescent phosphor coating. The purpose of the dark coating is to prevent or diminish light emission at acute angles to the general plane of the screen and to accommodate light transmission along lines generally perpendicular to the screen surface. Gold black and aluminum black were among the materials suggested in the prior art to provide this coating. Experience has shown, however, that both gold black and aluminum black tend to degrade when used in cathode ray tube manufacture. Degradation results from the liquid settling method of applying the phosphor coating and the heat treatment required at temperatures in excess of 425° C. for periods of one hour necessary to bake off lacquer used when preparing an aluminum backing mirror common in cathode ray tubes.

For example, it was found that gold black changed from black to a wine-red color as a result of the heating or baking process. Thus, the desired dark-appearing screen surface necessary to obtain high image contrast was destroyed.

Aluminum black, on the other hand though, does not color degrade during the baking operation. However, aluminum black will not adhere with sufficient mechanical strength to the glass surface of the screen. Thus, a poor base is provided for the application of the phosphor coating, resulting in flaking. The flaky phosphor coating does not maintain its physical integrity during tube operation and a phosphor coating applied over an evaporated aluminum black coating rapidly deteriorates in use.

SUMMARY OF THE INVENTION

Accordingly, it is a primary object of the invention to provide a cathode ray tube view screen structure having a contrast improving coating adhering to the inner surface thereof and having a phosphor coating in overlying relation therewith.

It is a further object of the invention to provide a contrast coating of the type described that will not color degrade during necessary heat treatment or baking operations.

It is a further object of the invention to provide contrast coating of the type described that adheres strongly to the glass surface of the tube thereby to provide a sound substrate for the application of the phosphor coating.

Specifically, the invention teaches a physical combination of gold and aluminum in determined ratios by weight initially applied to a tungsten filament. The combined gold and aluminum is then evaporated, in an imperfect vacuum, but heating the tungsten filament and thus depositing a continuous layer of the gold and aluminum alloy on the inner surface of the viewing screen in the form of gold-aluminum black. Thereafter, a conventional phosphor coating is settled on the contrast coating by conventional settling techniques.

Figure 1:
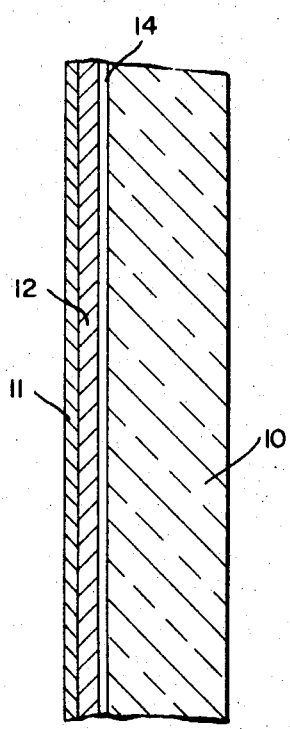

These and other objects and advantages of the invention will become apparent in the course of the following description and examination of the related drawings, wherein:

FIG. 1 is a vertical fragmentary cross-sectional view of the cathode ray tube screen incorporating a structure of the invention, and FIG. 2 is a partially schematic drawing illustrating a device which may be used to evaporate the contrast coating of the disclosed invention.

Describing the invention in detail and directing attention to FIG. 1, the numeral 10 indicates a glass plate as would be found in the viewing screen of a conventional cathode ray tube. The numeral 12 indicates a conventional phosphor coating which is usually applied to the inner surface of the viewing screen of a cathode ray tube and serves as a light source by virtue of its luminescent quality when bombarded by electrons. The phosphor coating 12 may be on the order of .003″–.004″ thick. A conventional electron penetrable aluminum film may be positioned as at 11 to improve light reflection as is well known in the art.

As will hereinafter be described in more detail the present invention teaches the application of a contrast coating 14 interposed between the phosphor coating 12 and the view screen 10 and directly on the inner surface of the screen 10. The coating 14 comprises gold-aluminum black made from a predetermined alloy of gold and aluminum in a conventional manner.

It will be understood that the examples hereinafter set out are by way of illustration in that somewhat differing ratios of gold and aluminum and somewhat varying evaporating pressures may be used to provide the gold-aluminum black depending upon the results desired. However, using the parameters hereinafter set out in the examples assures a resulting quality product.

Attention is directed to FIG. 2 which illustrates a suggested method of embodying the invention and a device to accomplish that result. A base plate 16 is provided, said plate having a bell jar 18 disposed thereon. A flexible, rubber-like gasket 20 is provided to effectively seal the internal chamber of the bell jar 18 from ambient atmosphere. A gauge 22 penetrates the plate 16 so that the level of pressure within the bell jar 18 may be continuously monitored.

A vacuum pump 24 communicates via line 26 with a filtering trap 28, the latter communicating with a central structure 30 of the bell jar and plate arrangement 16, 18. The last mentioned communication is established by a line 32 having a manually operable shut off valve 34 therein. An exhaust is shown at 31. The central structure 30 of the arrangement provides a mode for evacuating the cavity of the bell jar 18 when the pump 24 is operated.

A pair of electrodes 36, 36 projecting externally of the plate 16 also extend into the chamber of the bell jar 18. The electrodes are physically interconnected by a tungsten filament 38 which is prepared as hereinafter described. The filament 38 may thus be electrically heated by passing a current through the filament via the electrodes 36.

As a first example, we will consider the case where the coating 14 (FIG. 1) should comprise a black appearing layer. This desired coating may be obtained by first melting gold and aluminum at a ratio by weight of 3 parts gold to 1 part aluminum. After melting, the melted mixture is physically applied to a tungsten filament such as the filament 38. After application of the mixture to the tungsten filament 38, the filament 38 is placed in position in the bell jar 18 as shown in FIG. 2. A glass plate which is to be the view screen of a cathode ray tube, is mechanically positioned in the bell jar 18 as represented by the structure or workpiece 40 in FIG. 2.

After positioning the workpiece 40 and the tungsten filament 38 in the bell jar 18 a vacuum pressure condition is created in the bell jar of about $10^{-5}$ millimeters of mercury. The recommended distance between the tungsten filament 38 and the workpiece 40 is between 3" and 8". The tungsten filament 38 is then heated resulting in the evaporation of the combined aluminum and gold alloy from the filament. The evaporating particles migrate to the facing surface of the workpiece 40 and provide thereon a generally uniform coating over the entire surface of gold-aluminum black. Thereafter, a phosphor layer is conventionally settled over the coating in the usual manner. The structure of FIG. 1 is thus produced.

Some cathode ray tube service applications require a low diffuse reflectance for proper imaging. This operating condition may be achieved by a relatively smooth gray continuous contrast coating. It has been found that such a coating can be created by initially mixing an alloy of gold and aluminum in the approximate range by weight of 2 to 1 of gold to aluminum. Again, the combined mixture is physically applied to the tungsten filament 38 as above described and the filament 38 is positioned as shown in FIG. 2. The workpiece 40 is also positioned in the bell jar 18. In this example, a vacuum pressure condition of between $10^{-5}$ millimeters of mercury and $10^{-6}$ millimeters of mercury is created in the bell jar 18. The distance between the filament 38 and faceplate 40 may be between 4" to 12". Again, the combined aluminum and gold alloy is evaporated by the application of an electric current to the tungsten filament 38. The molecules of the evaporated alloy migrate to the workpiece 40 and deposit thereon resulting in a continuous uniform layer on the surface of the workpiece 40. Characteristically, the deposited coating has smooth dark gray appearance providing low diffuse light reflectances. The deposited coating should be thick enough to provide good light absorbing characteristics, yet not too thick which would result in opaqueness. As a guide a suggested thickness range is between 10 and 100 microns.

In summary, it has been found that the procedures described above enables the production of high contrast cathode ray tube viewing screens. The thin layer of gold-aluminum black firmly adheres to the inner glass surface of the view screen, thus providing firm substrate capable of supporting a phosphor or other luminescent coating. The gold and aluminum alloys herein described do not color degrade as did the prior art during phosphor application or required heat treating operations.

The invention as disclosed is by way of illustration and not limitation and may be modified in many respects all within the spirit and scope thereof.

What is claimed is:

1. An illuminating target structure for a cathode ray tube comprising the combination of a transparent viewing faceplate, a gold-aluminum black coating applied to the inner surface of the faceplate thereby to reduce visible light dispersion emanating from said faceplate.

and a cathode-luminescent material physically applied to said gold-aluminum black coating and adapted to create visible light when bombarded by electrons having a determined velocity.

2. An illuminating target structure for a cathode ray tube according to claim 1.

wherein said gold-aluminum black coating has a higher proportion by weight of gold relative to aluminum.

3. An illuminating target structure for a cathode ray tube according to claim 1.

wherein said gold-aluminum black coating is applied to said faceplate in a ratio by weight within a range of 3 parts gold to 1 part aluminum to 2 parts gold to 1 of aluminum.

4. An illuminating target structure for a cathode ray tube according to claim 1, wherein said gold-aluminum black coating has a thickness within the range of 10–100 microns.

References Cited

UNITED STATES PATENTS 2,567,714    9/1951    Kaplan _____ 313—92

RAYMOND F. HOSSFELD, Primary Examiner

U.S. Cl. X.R.

117—33.5; 178—7.85